T. O'Neill.
Outhaul for Booms.
Nº 92,539.   Patented Jul. 13, 1869.
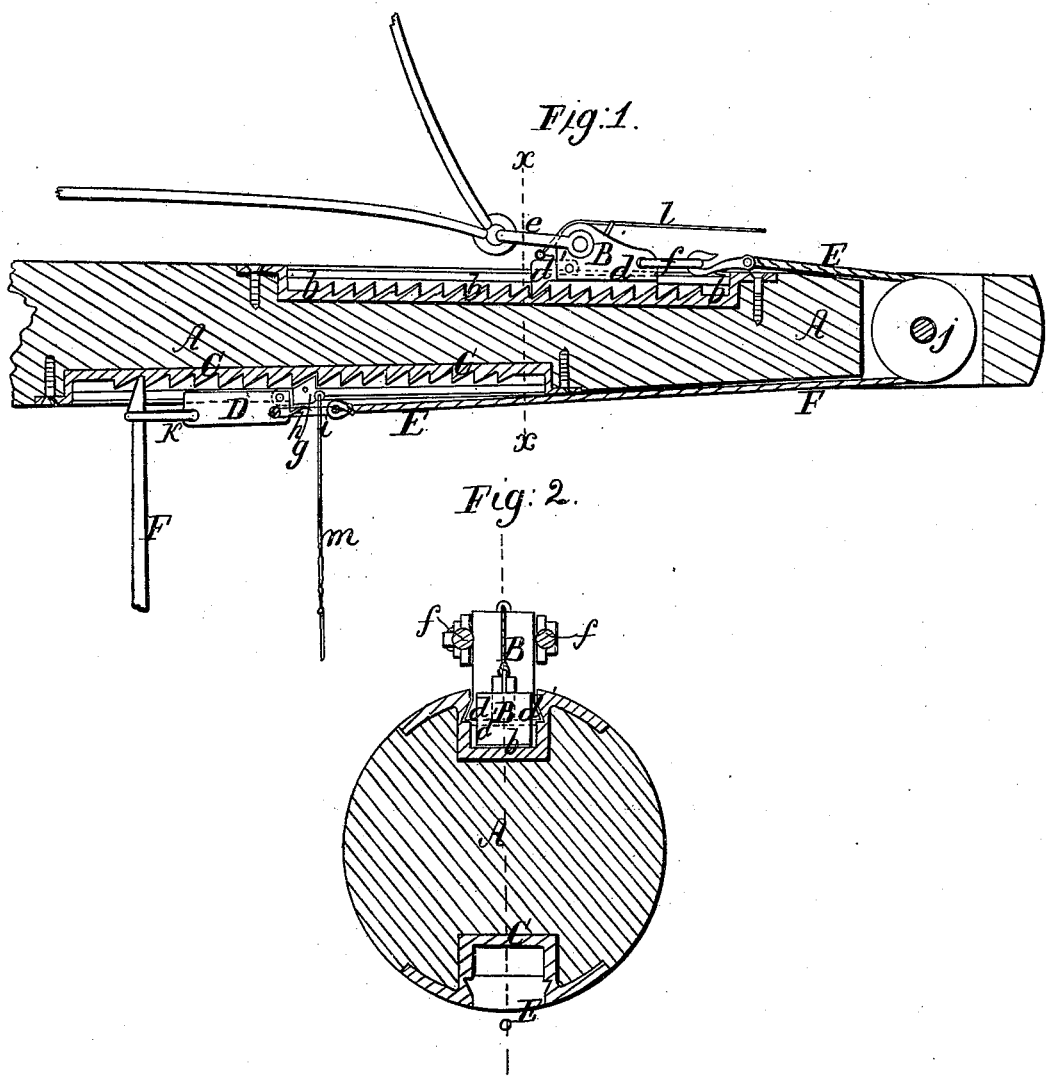
Witnesses;
John F. Brooks
George W. Mabee
Inventor;
T. O'Neill.
pr. Munn & Co
Attorneys

United States Patent Office.

THOMAS O'NEILL, OF NEW YORK, N. Y.

Letters Patent No. 92,539, dated July 13, 1869.

---

IMPROVED OUTHAUL FOR BOOMS.

---

The Schedule referred to in these Letters Patent and making part of the same.

---

*To all whom it may concern:*

Be it known that I, THOMAS O'NEILL, of New York, in the county of New York, and State of New York, have invented a new and improved Outhaul for Booms; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of a portion of a boom provided with my improved outhaul.

Figure 2 is a vertical transverse section of the same, the plane of section being indicated by the line $x\ x$, fig. 1.

Similar letters of reference indicate corresponding parts.

This invention relates to certain improvements on the outhaul for which Letters Patent, No. 82,133, were granted to George W. Leighton and C. O. Cole, on the 15th day of September, 1868.

The object of the present invention is to so construct the outhaul that it can be operated from the deck on fore-and-aft booms, and that the apparatus by which it is worked can be applied to the inner part of the boom.

The apparatus described in the aforesaid Letters Patent must be applied near the outer end of a boom or yard, opposite the claw of the sail, so as to receive the said claw in the manner there specified.

To move the pawl or dog, in order to stretch or slacken the sail, it was necessary that a man should go to the outer end of the boom, or stand on the foot-ropes, so as to come in reach of the dog or pawl.

I have invented an attachment to the aforesaid outhaul, whereby the operating-device can be carried to the under side of the boom, to the inner part of the same, so that the sail may conveniently be stretched or slackened by a man on deck.

My invention consists in securing another rack to the under side of the boom, near the inner part of the same, and in arranging a sliding dog, with spring-pawl, thereon, said dog being connected, by means of a rope or chain, that is passed over a pulley at the outer end of the boom, with the dog on the upper or main rack.

By operating the inner lower dog, the upper outer one will, in the same manner, be worked, and can be moved, to slacken or stretch a sail, without requiring the attendance of a man at the outer end of the boom.

The labor of making sails taut or slack is, by the use of my improved attachment, considerably reduced.

A, in the drawing, represents a portion of a boom.

$b$ is the rack, arranged near the outer end, on the upper side of the same.

B is the dog, working on the rack $b$, dovetailed, with its foot $d$, into a corresponding groove of the boom.

$d'$ is the pawl, pivoted to or connected with the dog.

$e$ is the loop, link, or staple, to receive the claw of the sail, and $f$, the ring, by means of which the dog is moved.

All these parts are constructed and arranged substantially as described in the aforesaid Letters Patent, and do not at all form part of my invention.

On the under side of the boom A is countersunk, or otherwise arranged, near the inner end of the same, at any part within convenient reach, another rack, C, on which a dovetailed sliding dog, D, is also arranged, as shown, said dog sliding in a track, provided on the boom, in a manner similar to that shown in the upper dog, and so that it cannot drop out.

To the dog D is hinged, or with it is connected a jointed pawl, $g$, which is, by a spring, $h$, attached to the dog, thrown into the rack C.

$i$ is a ring or loop, or equivalent device, formed on the outer part of the dog D.

It is, by means of a rope or chain, E, which passes over a roller, $j$, on the outer end of the boom, and which is fastened, with its other end, to the ring $f$ of the upper dog B, connected with said upper dog.

From the inner end of the dog D projects a loop, link, or staple, $k$, through which a lever, F, may be fitted, to draw it along.

Whenever, by means of the lever F, or otherwise, the dog D is drawn inward, the dog B will, by the connecting-rope E, be drawn outward, to haul the sail taut, the pawls $d'$ and $g$ locking both dogs in the teeth of the racks $b$ and D respectively, as is clearly shown in fig. 1.

A guy-rope, $l$, is secured to the pawl $d'$, and another, $m$, to the pawl $g$. By pulling on them, the dogs will be released, so that the sail may slacken itself when it is overstretched by shrinking.

It will be readily understood that this device can be conveniently worked on deck, as long as the dog B can be pulled by a lever, or otherwise, without requiring the boom to be reached.

Having thus described my invention,

I claim as new, and desire to secure by Letters Patent—

Connecting the sliding dog B of the outhaul, on the outer end of the boom, by means of a rope or chain, E, with a sliding dog, D, arranged on the inner part of the boom, at the under side of the same, so that the outhaul can be operated from deck, as specified.

THOS. O'NEILL.

Witnesses:
FRANK BLOCKLEY,
ALEX. F. ROBERTS.